US012639830B1

(12) United States Patent　　　(10) Patent No.: US 12,639,830 B1
Paul et al.　　　　　　　　　　　　(45) Date of Patent: May 26, 2026

(54) METHODS AND SYSTEMS FOR MONOLITHIC LINE-OF-SIGHT STABILIZATION

(71) Applicant: Arete Associates, Northridge, CA (US)

(72) Inventors: Andrew E. Paul, Longmont, CO (US); Kelly V. Hillman, Longmont, CO (US); Christopher R. Hornberg, Longmont, CO (US)

(73) Assignee: Arete Associates, Northridge, CA (US)

( * ) Notice: Subject to any disclaimer, the term of this patent is extended or adjusted under 35 U.S.C. 154(b) by 633 days.

(21) Appl. No.: 17/976,749

(22) Filed: Oct. 28, 2022

Related U.S. Application Data

(60) Provisional application No. 63/273,147, filed on Oct. 28, 2021.

(51) Int. Cl.
　　*G06T 7/246*　　　(2017.01)
　　*G02B 26/08*　　　(2006.01)
　　*G06T 7/73*　　　(2017.01)
(52) U.S. Cl.
　　CPC ..........　*G06T 7/248* (2017.01); *G02B 26/0875* (2013.01); *G06T 7/74* (2017.01); *G06T 2207/10016* (2013.01)
(58) Field of Classification Search
　　CPC .................................. G06T 7/248; G06T 7/74
　　USPC .......................................................... 382/103
　　See application file for complete search history.

(56) References Cited

U.S. PATENT DOCUMENTS

| | | | | |
|---|---|---|---|---|
| 6,652,511 B1 * | 11/2003 | Tomita | ................ | A61F 9/00821 606/4 |
| 8,400,619 B1 * | 3/2013 | Bachrach | ................ | G01C 1/04 356/4.1 |
| 9,087,387 B2 * | 7/2015 | Stettner | ................ | G01S 17/931 |
| 2017/0371353 A1 * | 12/2017 | Millinger, III | .......... | G06T 7/246 |

FOREIGN PATENT DOCUMENTS

| | | | | | |
|---|---|---|---|---|---|
| CN | 104764452 A | * | 7/2015 | .......... | G01C 21/165 |
| CN | 108846855 A | * | 11/2018 | .......... | G06N 3/0454 |
| WO | WO-2017150774 A1 | * | 9/2017 | | |

* cited by examiner

*Primary Examiner* — Jennifer Mehmood
*Assistant Examiner* — Eric James Shoemaker
(74) *Attorney, Agent, or Firm* — FisherBroyles, LLP; Gregory T. Fettig

(57) ABSTRACT

Described herein are methods and systems for stabilizing a laser on a moving platform with multiple modes of frequency generation using multiple sensors for sensing different frequencies of motion of the laser on the moving platform. The systems and methods use a processor to provide a plurality of feedback loops, comparisons, and/or combinations of data from the multiple sensors to create a set of correction data that is used to direct the laser output via a laser pointing correction system to achieve one or more output effects for tracking a target, guiding a vehicle or a munition and/or illuminating a scene in a particular manner while the platform is moving, including by using a combination of open loop and closed loop processing.

13 Claims, 15 Drawing Sheets

METHODS AND SYSTEMS FOR MONOLITHIC LINE-OF-SIGHT STABILIZATION

PRIORITY APPLICATIONS

This Patent application claims the provisional priority of U.S. Provisional Patent Application #63/273,147, filed Oct. 28, 2021, and entitled "METHODS AND SYSTEMS FOR MONOLITHIC LINE-OF-SIGHT STABILIZATION," the contents of this priority Application are incorporated herein by reference for all purposes.

STATEMENT OF GOVERNMENT SPONSORSHIP

The disclosed invention was first reduced to practice under funding from SBIR topic #AF141-130 (Air Force Contract FA8651-16-C-0163).

FIELD OF THE TECHNOLOGY

The present disclosure relates to stabilization of optical pointing systems.

SUMMARY OF THE DESCRIPTION

Described herein are methods and systems for stabilizing a laser on a moving platform with multiple modes of frequency generation and through using multiple sensors for sensing different frequencies of motion of the laser on the moving platform, including movement from the platform itself, or from a mounting of the laser on the platform, such as a handheld laser held by an operator on a moving vehicle. The systems and methods use a processor to provide a plurality of feedback loops, comparisons, and/or combinations of data from the multiple sensors to create a set of correction data that is used to direct the laser output via a laser pointing correction system to achieve one or more output effects for tracking a target, guiding a vehicle or a munition and/or illuminating a scene in a particular manner while the platform is moving, including by using a combination of open loop and closed loop processing.

In one aspect, the disclosure describes a system, including a laser steering system adapted for use on a platform that is moving relative to a target in a scene that is illuminated by the laser from a platform. The system also includes an inertial measurement unit (IMU) connected with the laser steering system and a processor connected to the inertial measurement unit and the laser steering system.

The processor is adapted to perform the step of receiving first image data from an imaging system viewing the target in the scene during a first exposure window of a first frame cycle of the imaging system. The processor is further adapted to perform the step of calculating background shift data based on an image flow analysis of the first image data and a plurality of image data received prior to the first frame cycle. The processor is further adapted to perform the steps of receiving IMU data from the IMU and removing drift from IMU data with the background shift data to create updated IMU data. The processor is further adapted to perform the step of, based on the first image data and the background shift data, calculating a relative position of the target in the scene. The processor is further adapted to perform the step of estimating a time for the laser steering system to reach compliance with a pointing command sent by the processor. The processor is further adapted to perform the step of, based on the time for the laser steering system to reach compliance, estimating a steering delay time before a time of a next laser pulse cycle that is able to be steered by the laser steering system after reaching compliance with the pointing command and that does not occur during an exposure window of the imaging system. The processor is further adapted to perform the step of, based on the steering delay time, calculating a projected system pointing direction relative to the scene at the time of the next laser pulse cycle using both the updated IMU data and the relative position of the target in the scene. The processor is further adapted to perform the step of, based on the projected system pointing direction at the time of the next laser pulse cycle, calculating a projected target pointing direction at the time of the next laser pulse cycle. The processor is further adapted to perform the steps of based on the projected target pointing direction, creating the pointing command for the laser steering system that does not occur during an exposure window of the imaging system, and sending the pointing command to the laser steering system to steer the laser during the next laser pulse cycle.

DETAILED DESCRIPTION

The following patent description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and such references mean at least one. Reference in this specification to "one embodiment" or "an embodiment" or the like means that a particular feature, structure, or characteristic described in connection with the embodiment is included in at least one embodiment of the disclosure. The appearances of the phrase "in one embodiment" or the like in various places in the specification are not necessarily all referring to the same embodiment, nor are separate or alternative embodiments mutually exclusive of other embodiments. Moreover, various features are described that may be exhibited by some embodiments and not by others.

The systems and methods described herein may be used to maintain a pulsed output with a significant repetition rate over a period of time in which fundamental operating parameters of the laser may have changed. The methods described herein include methods that seek and settle upon operating parameters that produce pulses with desired output characteristics despite changes in the operation of the laser, such as through the changing of temperatures or the aging of components therein.

Described herein are systems and methods for monolithic line of sight stabilization of a laser using the laser steering system have to maintain the pointing of a laser on a target while the laser and pointing system are on a platform that is moving in some embodiments the target may also be moving. Sources of jitter may include platform movement and may include inadvertent human error such as hand tremor. as described further herein the sources of these errors may add to a significant jitter error that causes degradation in the performance of the laser as a designator or other tracking device.

Unmitigated jitter in a laser can cause deleterious operation particularly for lasers used as designators in tracking or armament systems. Stabilizing this jitter in a laser spot on a designated target or waypoint provides margin for systems that rely on this guidance, particularly when pulses of the laser are used to avoid overlapping imaging periods and washing out imagery of the target. Pulsing of lasers and modes of avoiding overlap between laser pulses also introduce further design constraints, particularly when trying to stabilize the pointing of a laser spot over several laser pulses and while the platform and target are moving. Therefore, a robust stabilization system has been designed to adapt to the particular requirements.

Figure 1:
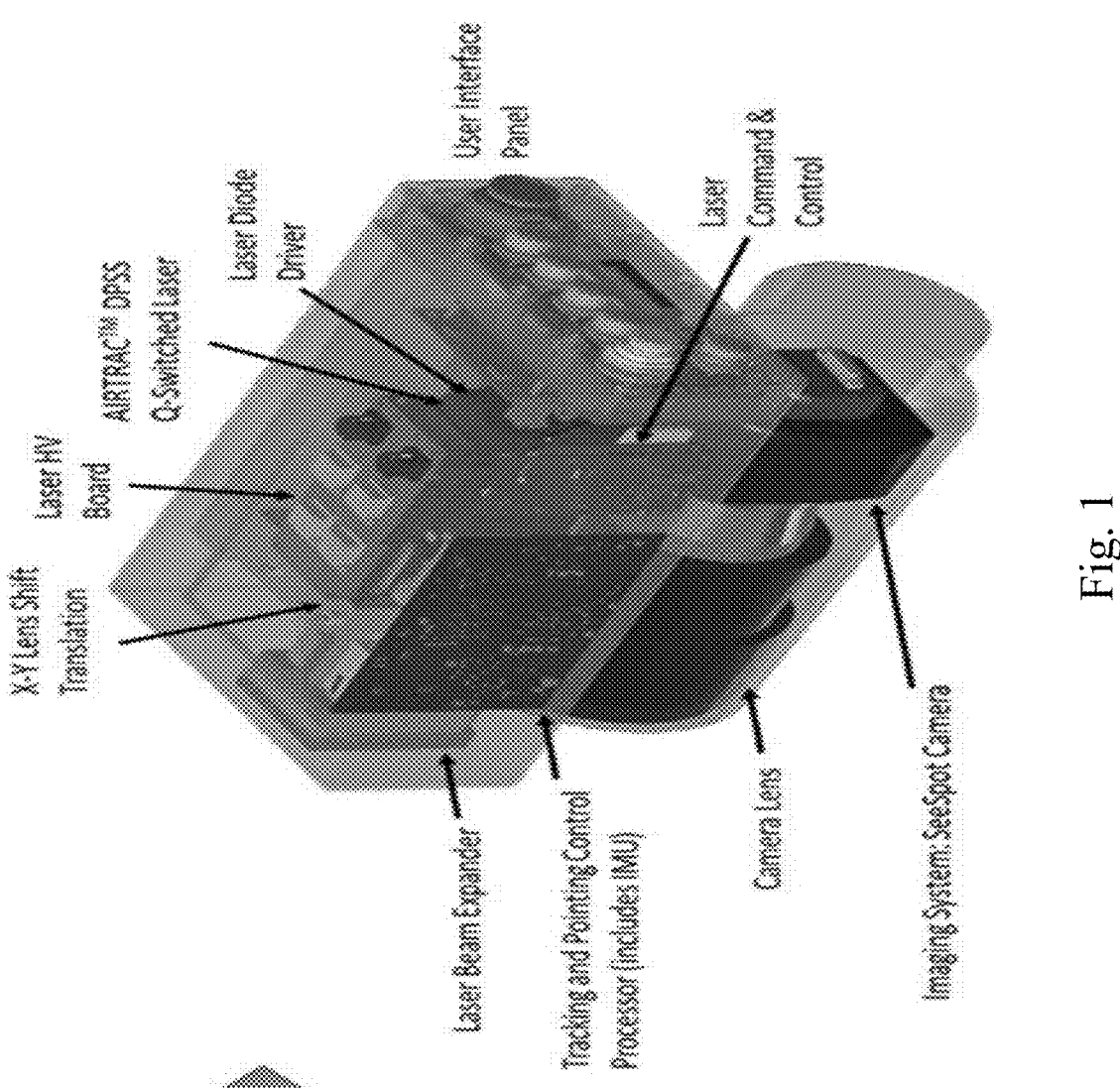
FIG. 1 shows an exemplary laser stabilization system with related hardware, laser, and imaging system.

FIG. 1 shows an exemplary laser stabilization system with related hardware, laser, and imaging system. The laser stabilization system is surrounded by many components that are carried with the laser on the platform. for example, there is a laser and associated laser diode driver and high voltage electronics board for running the Q switches on the pulsed laser. In some embodiments land shifters need to be shielded from the EMI produced from the high voltage Q switches.

shown also are lens shift translations which may be described generally as a laser steering system. Also incorporated with the laser stabilizing dictation system is an imaging system shown here as a see-spot camera with an associated lens. The system also includes a processor with an incorporated IMU that is connected to a laser command and control board, such as for timing laser pulses. As described herein, several embodiments do not use the see-spot camera for all of its features, such as taking an image when the laser is pulsed on the target. The system also includes a user interface panel for selecting modes of operation as described herein, such as modes where the illuminated laser spot is captured by the imaging system.

Figure 2:
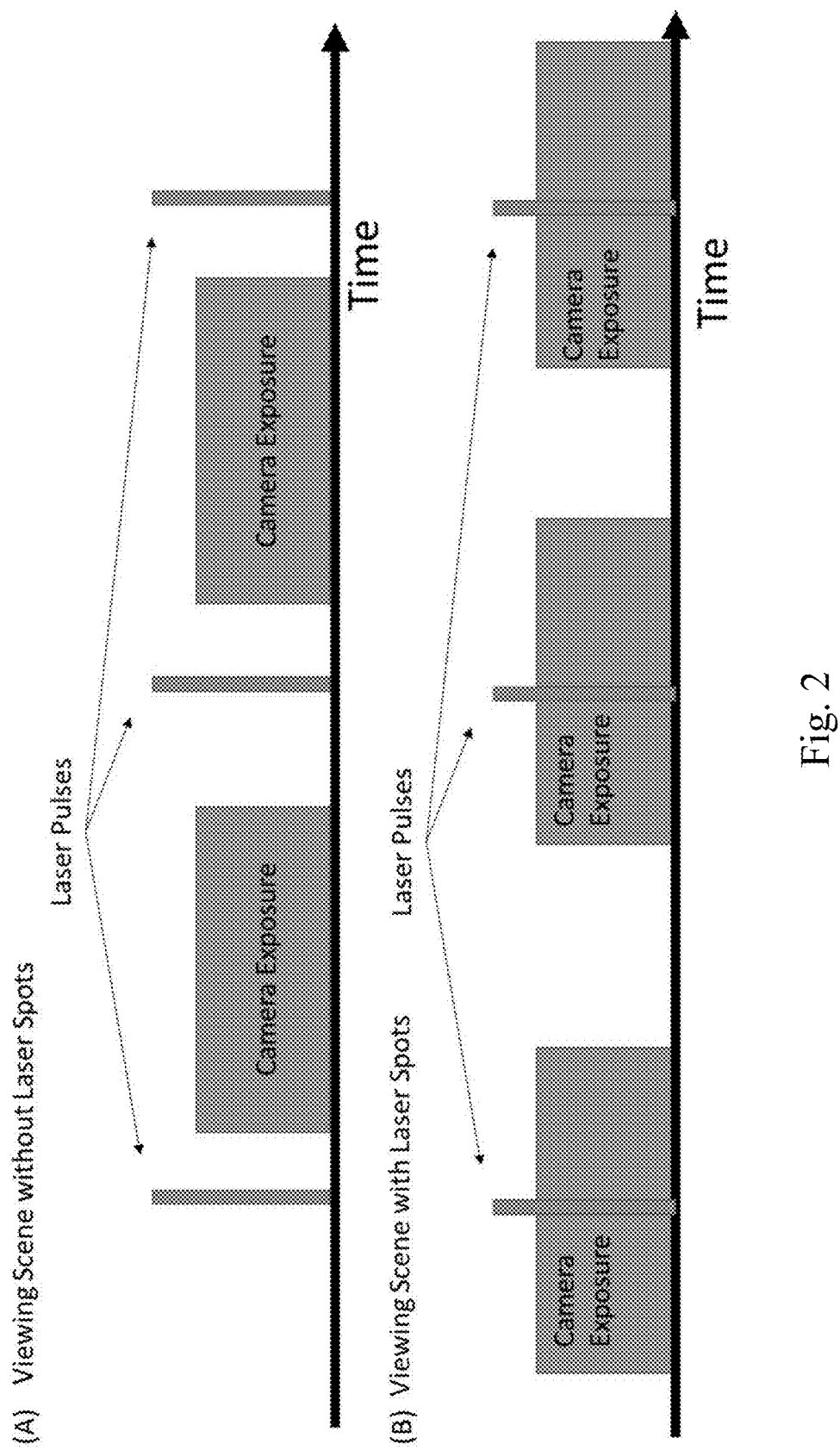
FIG. 2 shows options for selecting timing of a laser pulse output to occur during an imaging system exposure period or to occur outside an imaging system exposure period.

FIG. 2 shows options for selecting timing of a laser pulse output to occur during an imaging system exposure period or to occur outside an imaging system exposure period. As showing the figure laser exposures during pulsed laser outputs may be timed to occur during the camera exposure or in between camera exposures. As described further herein, camera exposure selection during laser output is an operational method that is selected by a user such as visibly be able to confirm the laser designator output as it appears in the scene. However, many embodiments desire that desire that the laser pulse not form a bright spot in the image. therefore, in one embodiment successive laser pulses are selected to be timed outside of an exposure window for the imaging system.

Figure 3:
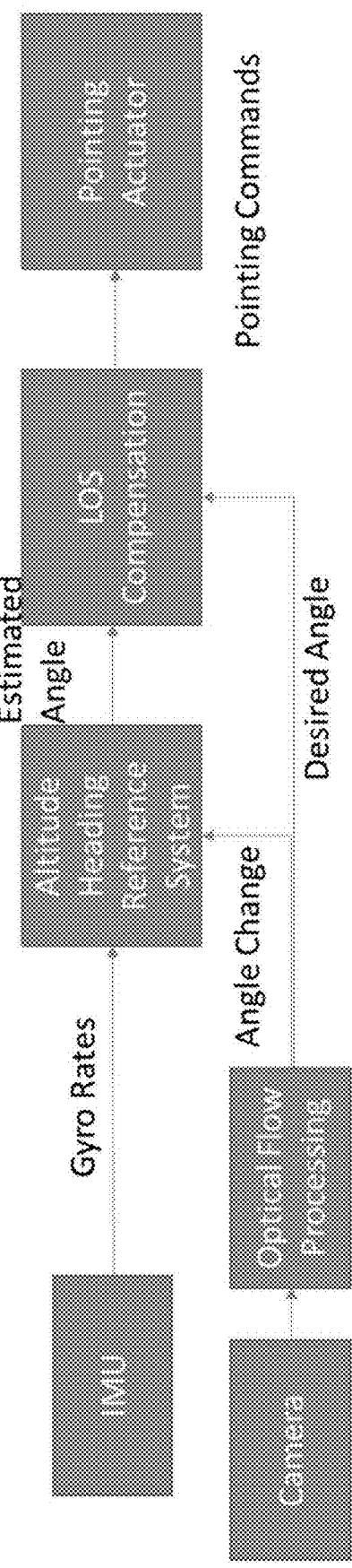
FIG. 3 shows a flow chart of an exemplary embodiment for data processes for creating a series of pointing commands for stabilizing the line-of-sight (LOS) via fusing data from the IMU and the imaging system.

FIG. 3 shows a flow chart of an exemplary embodiment for data processes for creating a series of pointing commands for stabilizing the line-of-sight (LOS) via fusing data from the IMU and from the imaging system. The diagram shows data flow starting from the IMU and camera (e.g., imaging system) through to the pointing commands reaching the laser stabilization system pointing actuators. Many of the functional blocks shown here in may be included in the processor described herein. For example, the optical flow processing attitude heading reference system and LOS compensation algorithm blocks may all be integrated in a processor while the IMU may be connected nearby and/or integrated onto the same package as the processor.

The camera image data is fed into image processing algorithms to detect the angular shift in the scene (labeled as Optical Flow Processing in the diagram). Angle changes from these algorithms along with gryo rates from the IMU are used to maintain high frequency correction to the sensed pointing direction within the processor an attitude heading reference system (AHRS) algorithm block. This AHRS includes at least one Kalman filter or other predictive filter, as described further herein for motion prediction. Multiple Kalman filters may be used in several embodiments such as for modeling the movement of the target the movement of the platform and even particular sources of jitter that are induced into the systems by human operators.

The Optical Flow Processing algorithms may additionally include target tracking to place angular velocity bias on the LOS stabilization when the stabilized laser pointing system is intended to track a moving object.

In the processing of FIG. 3, the desired pointing angle is provided to the LOS Compensation algorithms block along with the current system orientation (i.e., estimated angle) from the AHRS. The LOS compensation algorithms then look up the control signals (e.g., pointing commands) required to achieve the desired laser locations based on the system orientation and desired pointing direction.

Figure 4:
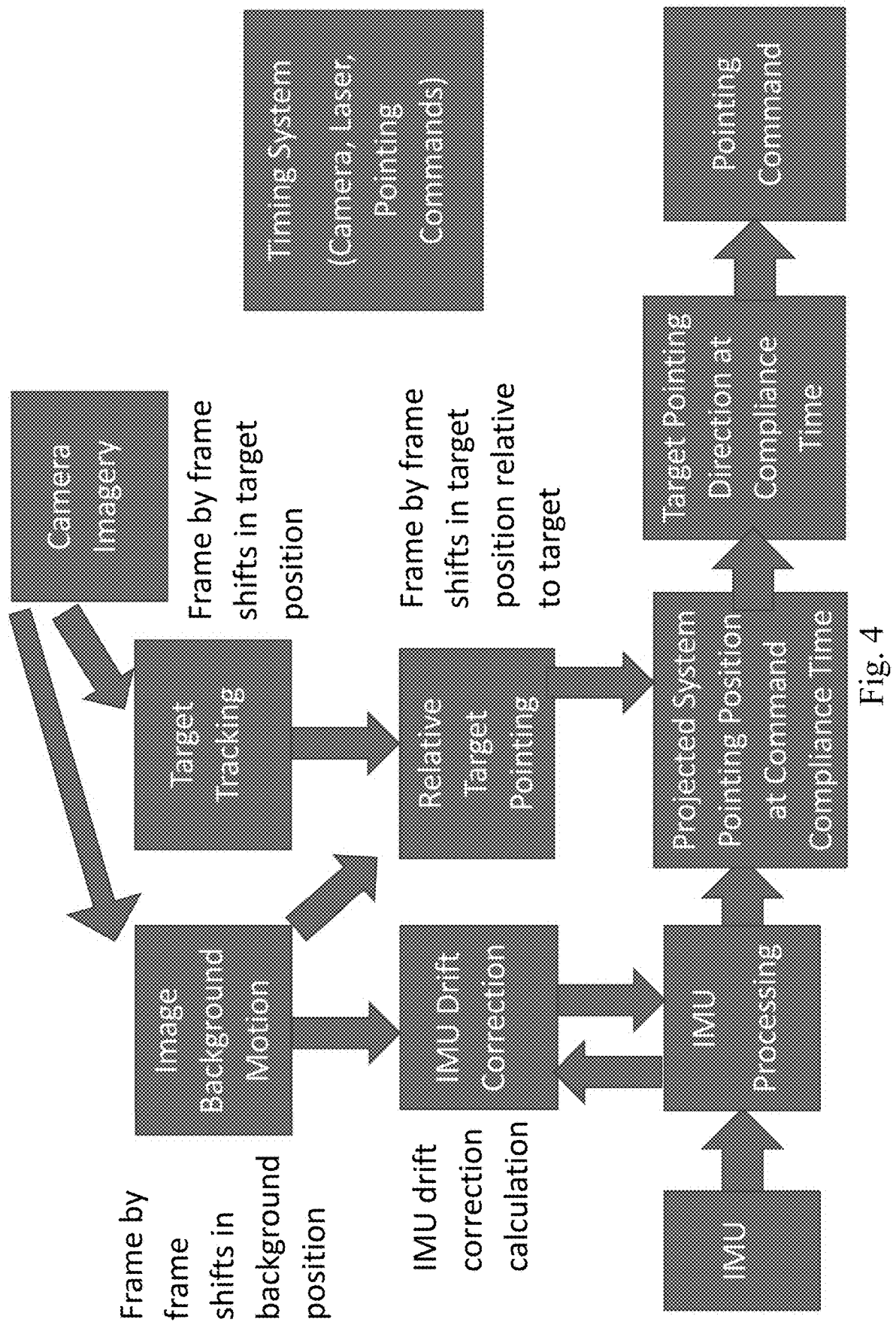
FIG. 4 shows a flow chart with exemplary embodiments of further details for data processes for creating a series of pointing commands.

FIG. 4 shows a flow chart with exemplary embodiments of further details for data processes for creating a series of pointing commands. The flow chart begins with camera imagery that is received from an image in sensing system an imaging system at an imaging rate that is determined for the imaging system. The exposure period of the imaging system maybe a fixed time period or may be controllable by the processor.

The camera imagery may be processed in parallel by the processor with two different algorithms shown as image background motion processing and image target tracking.

The image background motion processing is used for drift correction of the IMU to correct for drift since the last update from optical flow processing. The image background motion processing may also be used in determining a relative position of the target in the scene. the camera imagery from the imaging system is also used as described further herein for target tracking in order to complete a determination of the relative position of the target with respect to the scene.

The IMU data is corrected for drift by use of the background motion processing. The updated IMU data is used to create a projected system pointing position. as described further herein the projected system pointing position may be computed using a Kalman or other predictive filter to predict the projected system pointing position at a time in the future when command compliance will be achieved by the laser steering system (e.g., the pointing actuators have settled to within desired tolerances). As described further herein multiple Kalman filters may be adapted for predicting this time in order to provide pointing commands at the correct time to steer the laser and thereby minimize physical jitter between pulses. Several physical embodiments of steering systems may be used, and each have their own physical response characteristics for computing a compliance time and for predicting behavior through a predictive or Kalman filter. For example, steering systems may include a Risley prism (included before or after a beam expander), MEMS devices, voice coils, piezo stack shifters, or lens shifters and each of these actuators has particular characteristics for responding to pointing commands.

As described further herein, the target pointing direction also is computed by the processor as it is estimated to be at the command compliance time. As described further herein in some embodiments where the laser pulse is desired to be controlled to be either inside or outside or have a relative phase with respect to the imaging system exposure time. In other words, the next laser pulse may be selected at a time later than the earliest command compliance time (e.g., after a delay to the next laser pulse time period that is not occurring during an imaging system exposure time period).

Figure 5:
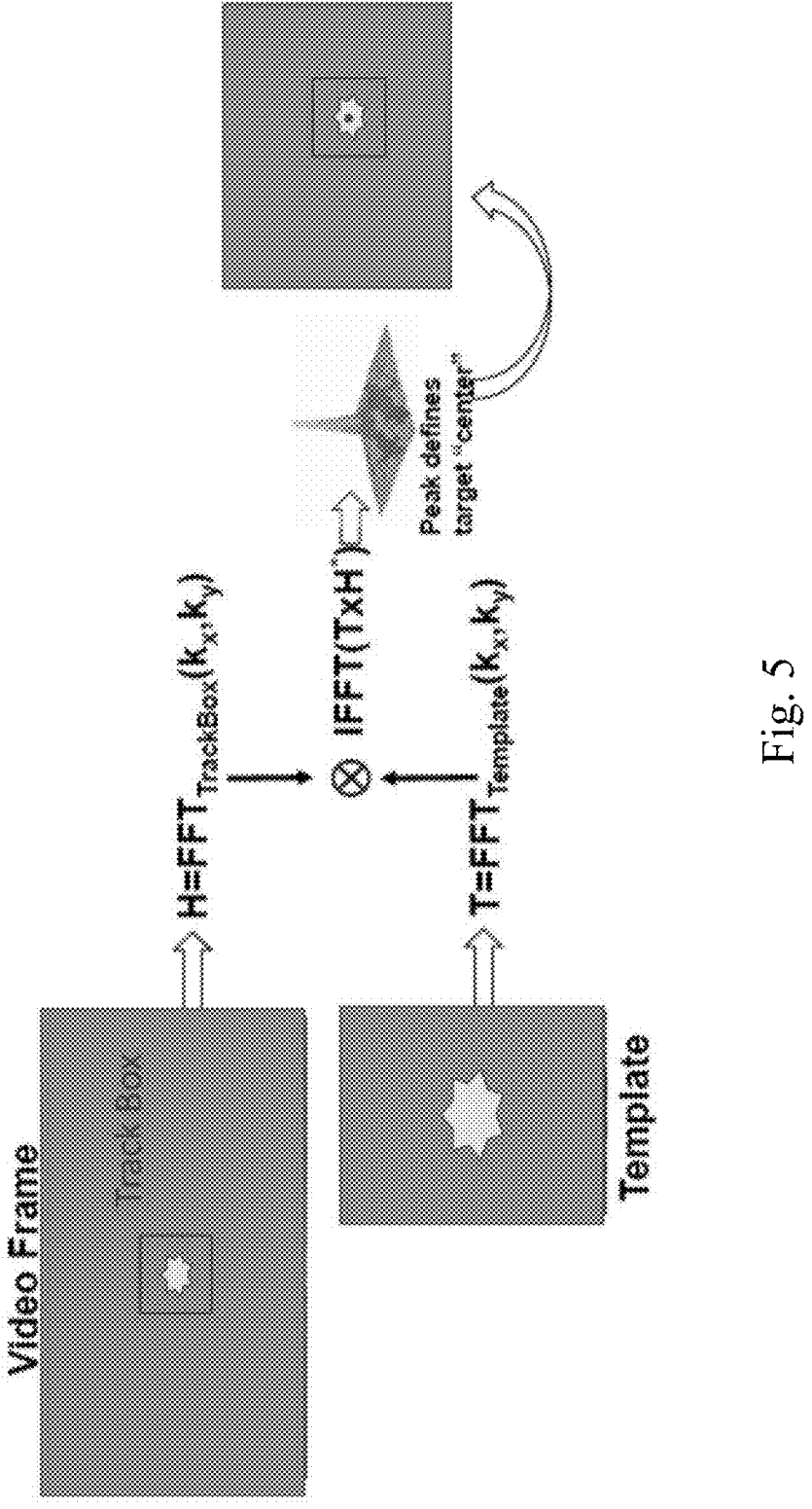
FIG. 5 illustrates an FFT-based target tracking using optical flow processes on image data from the imaging system.

FIG. 5 illustrates an FFT-based target tracking using optical flow processes on image data from the imaging system. FFT-based tracking may use correlation functions as shown to create an image with a peak and a side lobe indicating a measure of quality for the correlation of the image with an image template. The template may be rotated, adapted, substituted, recreated in the process of creating a position of the target relative to the scene for use in creating a pointing command, as described further herein.

The imaging system creates an image, such as the video frame shown, and then an 2D FFT of the image and the template to thereafter creates a correlation image. A track box is then centered around the correlation peak, which defines the center of the correlation between the template and the video frame.

Other correlation processes may be used by the processor described herein for processing imaging data from the imaging system. For example, several different digital signal processing techniques can be used to locate the position of the target in the scene including using techniques with lower resolution than an FFT and correlation peak analysis done on a portion of a video-quality full-frame imaging system.

Figure 6:
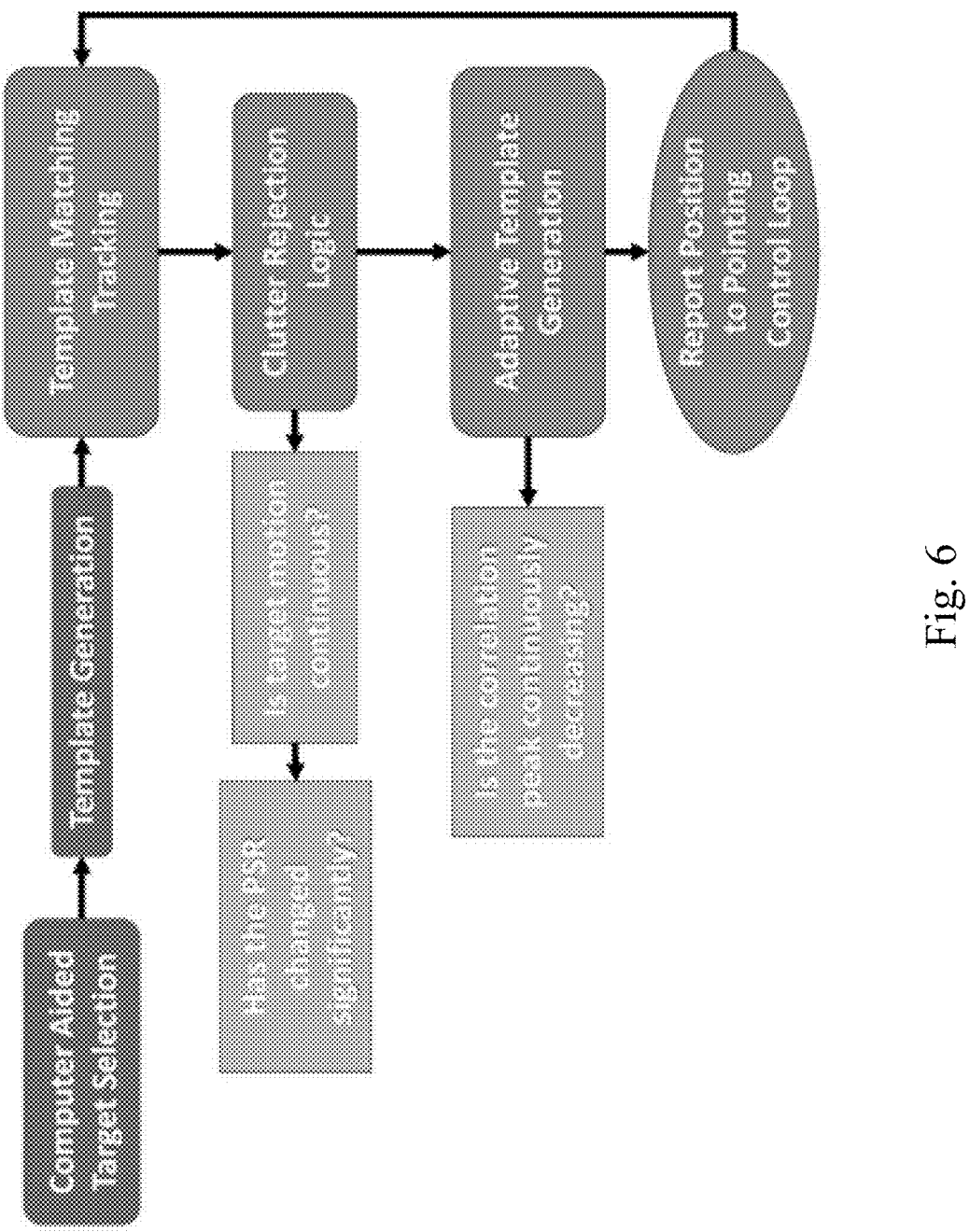
FIG. 6 illustrates further details for target tracking processes including adaptive template generation in the process of creating a position of the target for use in creating a pointing command.

FIG. 6 illustrates further details for target tracking processes including adaptive template generation in the process of creating a position of the target for use in creating a pointing command. The flow chart includes the flow chart includes computer aided target selection and template generation to start the process for template matching tracking.

Computer Aided Target Selection: The system must allow the user to identify the target of interest that is required to be tracked. When the "cross hairs" of the video are placed on the target, the operator can select the object at that location. At that point, the video processor will identify the object of interest. This is achieved using various techniques such as edge detection followed by a connected component analysis to identify the boundaries of the object of interest.

Template Generation: The target template is simply a snip of the video image surrounding the target location. Using the boundaries determined by the computer aided target selection routine a template box is generated. The template can be further improved by utilizing successive images that are averaged to suppress background inclusion. A spatial fast Fourier transform (FFT) is performed and the FFT is stored for the comparison stage of the tracking algorithm.

Template Matching Tracking: As described above the template-matching algorithm consists of multiplying the FFT of the current video frame with the FFT of the target template and performing an inverse FFT. The location of the correlation peak determines the target location. A region of interest (ROI) is determined that defines and extended track box. This ROI is defined to anticipate the position of the target by including an extent that includes the effect of hand tremor (e.g., ±8 mrad of angular motion). This extended track box can be dynamically modified to reflect real time measurements of the pointing disturbance to optimize the processing time for this step in the tracking algorithm.

Clutter Rejection Logic: Background clutter can interfere with the ability of the track algorithm to "lock" onto the correct object in the scene. Several steps can be taken to mitigate this issue. The first step is to ensure that the current estimate of the target location represents continuous motion for the target. This is a straightforward approach as the targets of interest will not be quickly moving from one location to another in the scene. As second piece of information used to reject clutter is related to the correlation peak height. By tracking the variation in the correlation peak one can determine the validity of a local peak when a sudden change occurs. Throughout the lifetime of the program, continual testing and data collections will allow the tuning the clutter rejection parameters.

Adaptive Template Generation: The approach being used does not attempt to create a pose independent template. As the target moves through the scene and its orientation changes, a previous template will be insufficient to produce a large correlation peak. The standard measure of quality for a correlation peak is the peak to side lobe ratio (PSR) which is the ratio of the height of the largest correlation peak to the next highest peak in the correlation image. When the PSR becomes too small, the ability to locate the target is lost. Consequently, the history of the PSR serves as an indicator that the template needs to be updated because of changes in the target orientation. At this point a new template is generated based on the current target location.

Figure 7:
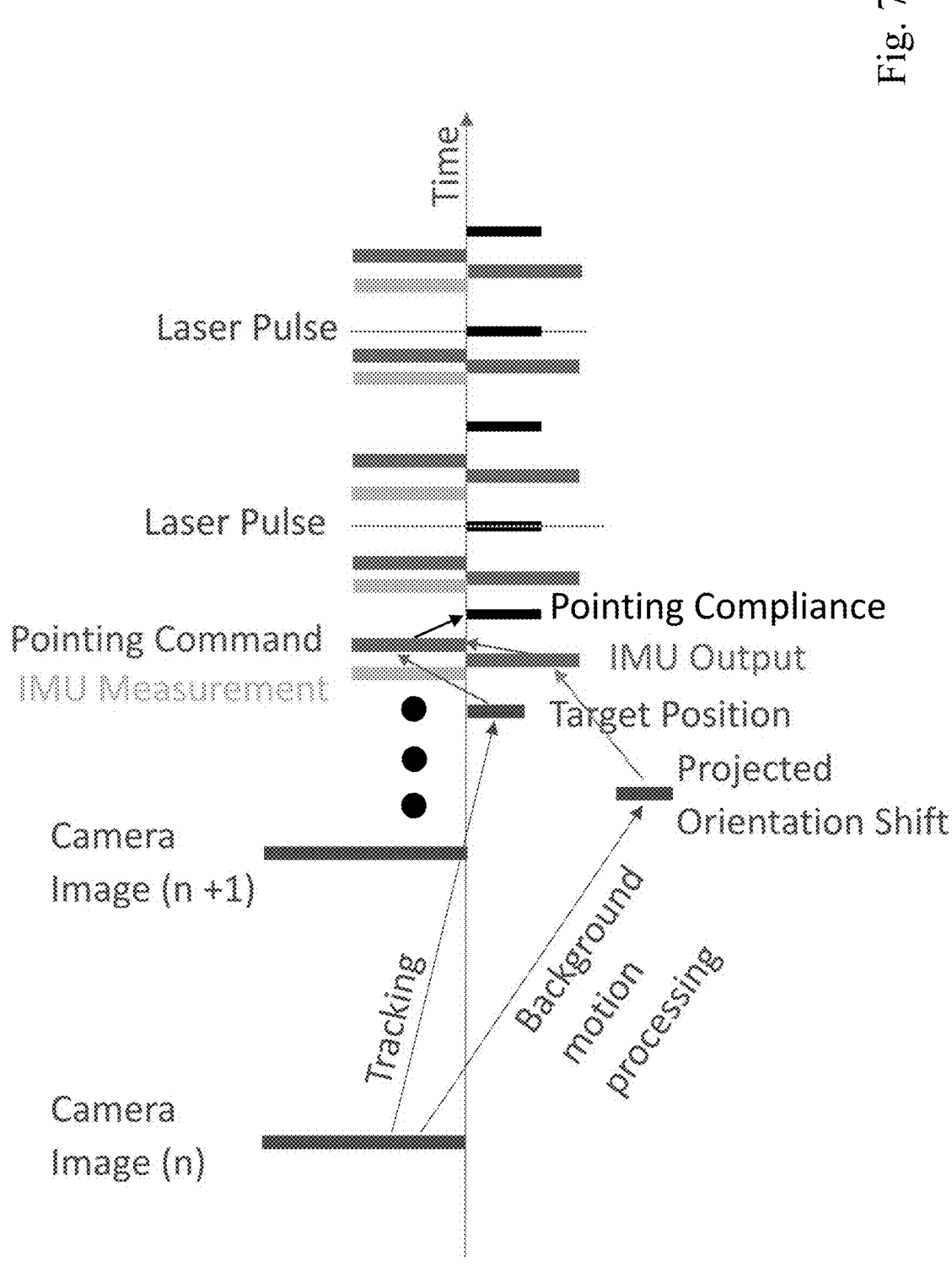
FIG. 7 illustrates an exemplary timeline of processes herein with the relative times of processing image data, combining data processed from the image with IMU data, providing a pointing command, and the time for pointing compliance.

FIG. 7 illustrates an exemplary timeline of processes herein with the relative times of processing image data, combining data processed from the image with IMU data, providing a pointing command, and the time for pointing compliance. The timeline shows further timing details have a camera image received and background motion processing being started with target position tracking being performed in parallel. As described further herein after the target position and projected orientation shift are computed by the tracking and background motion processing, respectively. They are each used to fuse with the IMU data to create a pointing command in time to transmit to a laser steering system to meet a pointing compliance time. As shown in the example herein, the first pointing compliance time after the pointing command is valid is not populated by laser pulse. For example, that pointing compliance time may have overlapped with one of the camera imaging system exposure periods shown on the left (e.g., camera image (n), camera image (n+1). In this example, the camera image (n+1) may have an updated target position and projected orientation shift that may be combined with the next IU output in order to create the next point in command in time for the next point in compliance at which time a laser pulse will be output.

The ellipses shown over the timeline between the camera images and the IMU measurements and pointing commands illustrate the asynchronous nature of the camera and the processor in one embodiment. Indeed, in one embodiment, the IMU measurements and the validity of pointing commands may asynchronously walk with respect to the camera image rate, therefore leading to scenarios described further herein where camera data is further delayed waiting for appointing compliance that does not occur during an image integration exposure time period.

Figure 8:
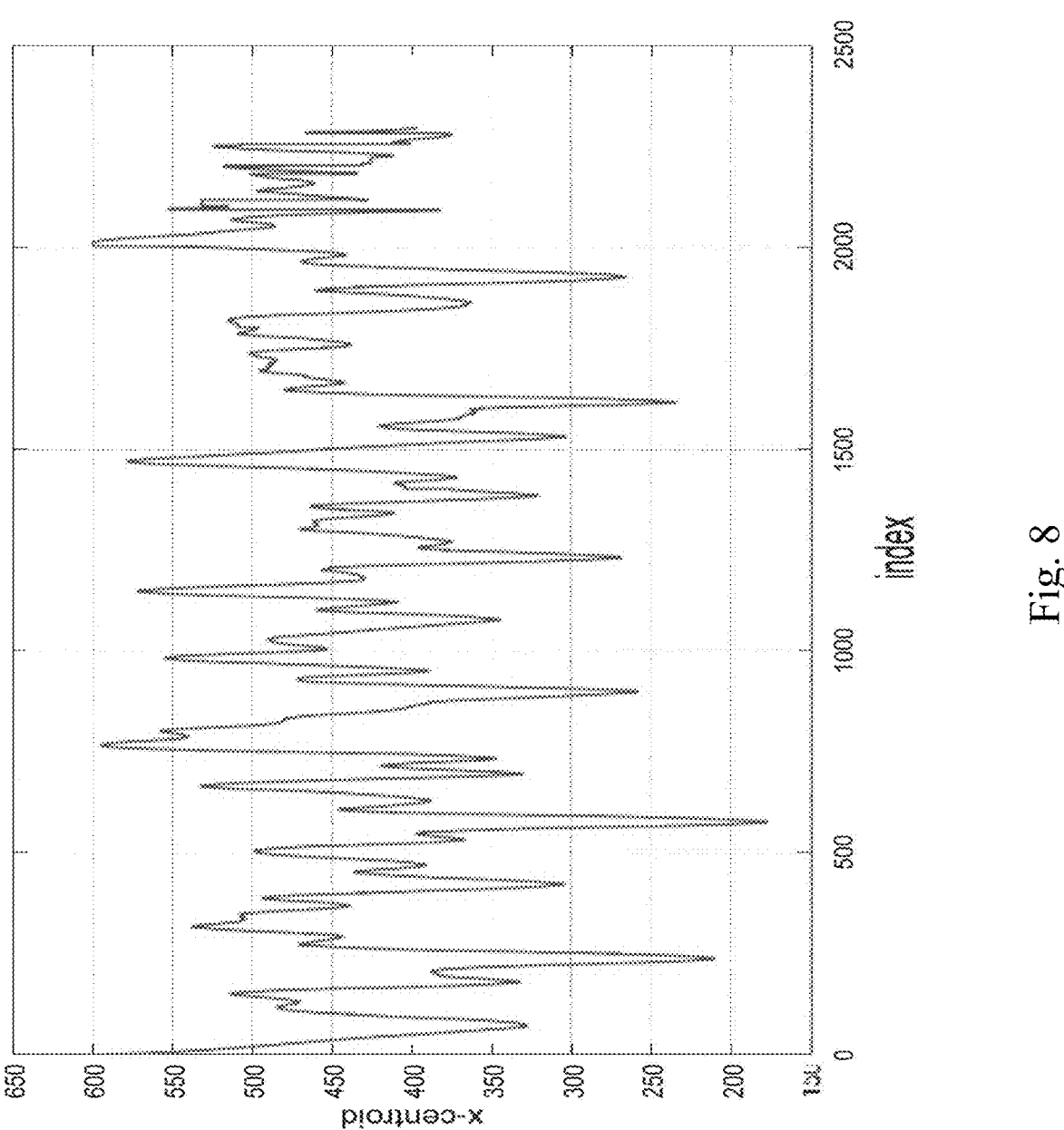
FIG. 8 shows an exemplary time series data from a measured hand tremor showing frequency characteristics over time.

FIG. 8 shows an exemplary time series data from a measured hand tremor showing frequency characteristics over time. The time series shows that hand tremors are random and normally centered. the time access is in milliseconds showing an array of frequencies in the hand tremor with lower frequencies on the order of several Hertz and with higher frequencies of smaller amplitude. The timescale on the bottom is indexed in milliseconds showing roughly 2.5 seconds in total.

Figure 9:
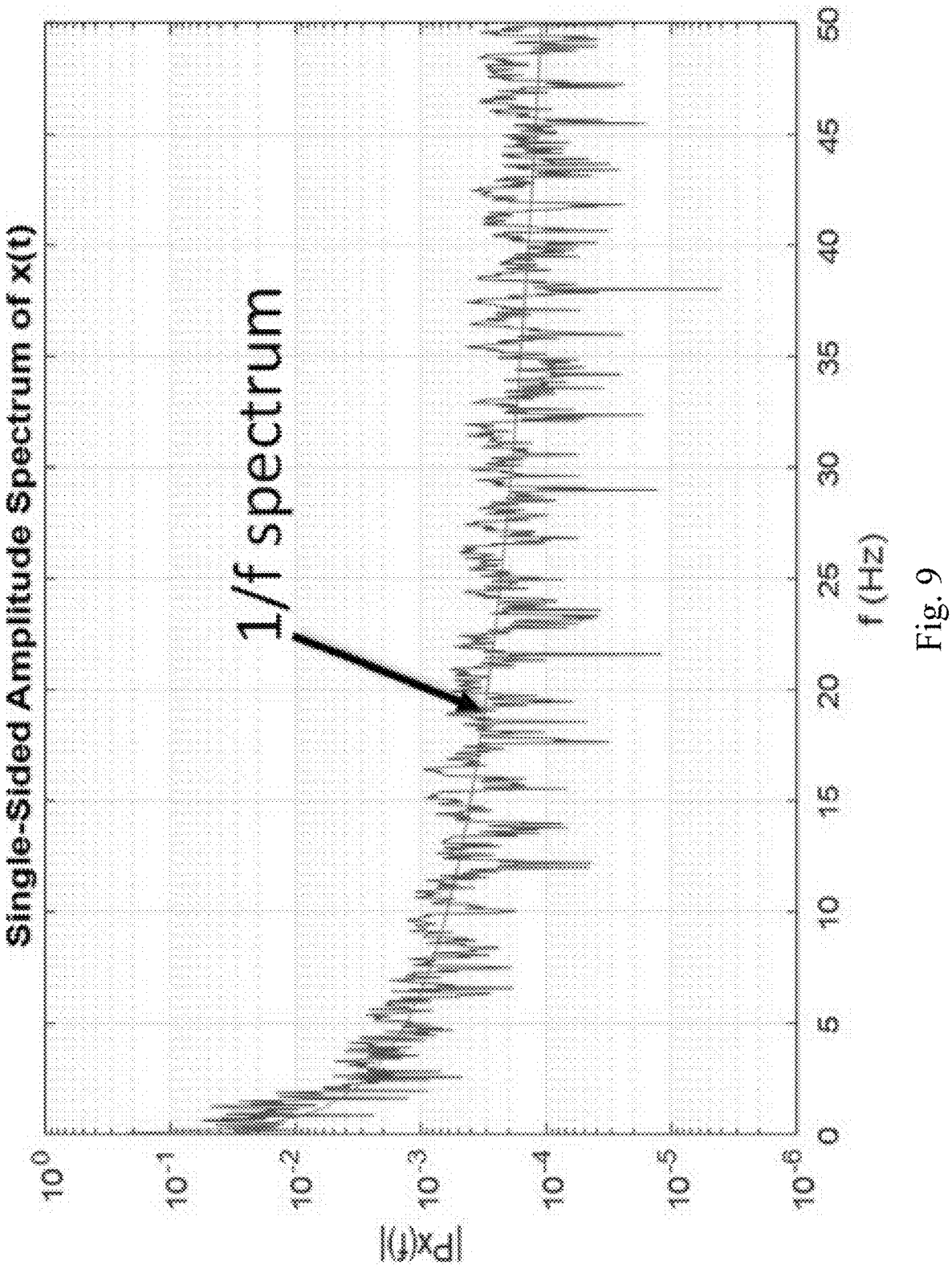
FIG. 9 shows a frequency analysis of the exemplary data of the measured hand tremor showing frequency characteristics over time.

FIG. 9 shows a frequency analysis of the exemplary data of the measured hand tremor showing frequency characteristics of the hand tremors. The frequencies highlighting the peak and amplitude around several Hertz and falling off as an inverse inversely proportional to the frequency. These frequencies as described further herein may be captured by high bandwidth IMU signals. Data with frequencies on the lower end may be captured between successive exposure periods of the imaging system. As described further herein, combining images that have updates with much lower frequency than the IMU allows for jitter gains beyond simple correction of drift of the IMU signals from the image background motion analysis or use of only high bandwidth gyro data from the IMU to suppress jitter. As shown further herein, combining this data with the particular methods described herein reduces residual jitter beyond that which can be expected from simply the combination of the effects of mitigating jitter either with the IMU data or with the camera data alone.

Figure 10:
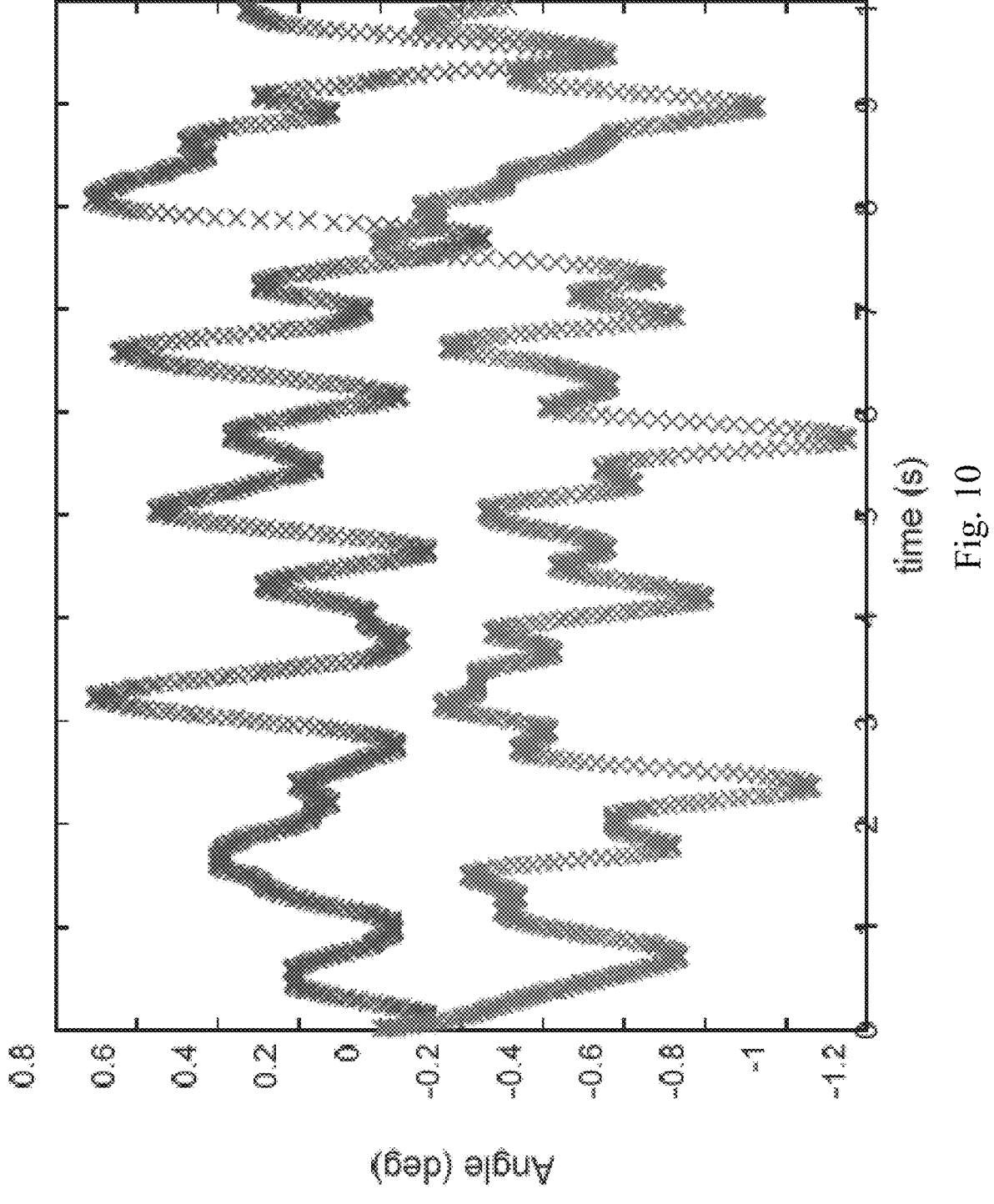
FIG. 10 shows an exemplary time series data of disturbances from both platform movement and hand tremor.

FIG. 10 shows an exemplary time series data of disturbances from both platform movement and hand tremor. Hand tremors and platform movements or disturbances maybe combined into physical disturbances of the laser. as described further herein, the laser jitter can be extremely deleterious when using the laser for target designation or other designation purposes. For example, because of the periodic nature of the laser designator movement of the beam on the target, or off the target, can cause tracking algorithms (e.g., in guided munitions, in an autopilot) that use the laser designator for guidance to malfunction if the jitter is extreme between laser pulses of the designator. Shown in the figure are disturbances measured in degrees over a period of 10 seconds. Further figures show the mitigation of these disturbances as measured milliradians (mrad) for the finer precision. The conversion factor of 0.1 degree per 1.7 mrad may be used to compare visually the great reduction in jitter in the following figures that show first the mitigating effects of only portions of the embodiments herein (FIGS. 11 and 12), and then show in FIG. 13 the surprising combined mitigation effects of using both the IMU and optical flow data described herein.

Figure 11:
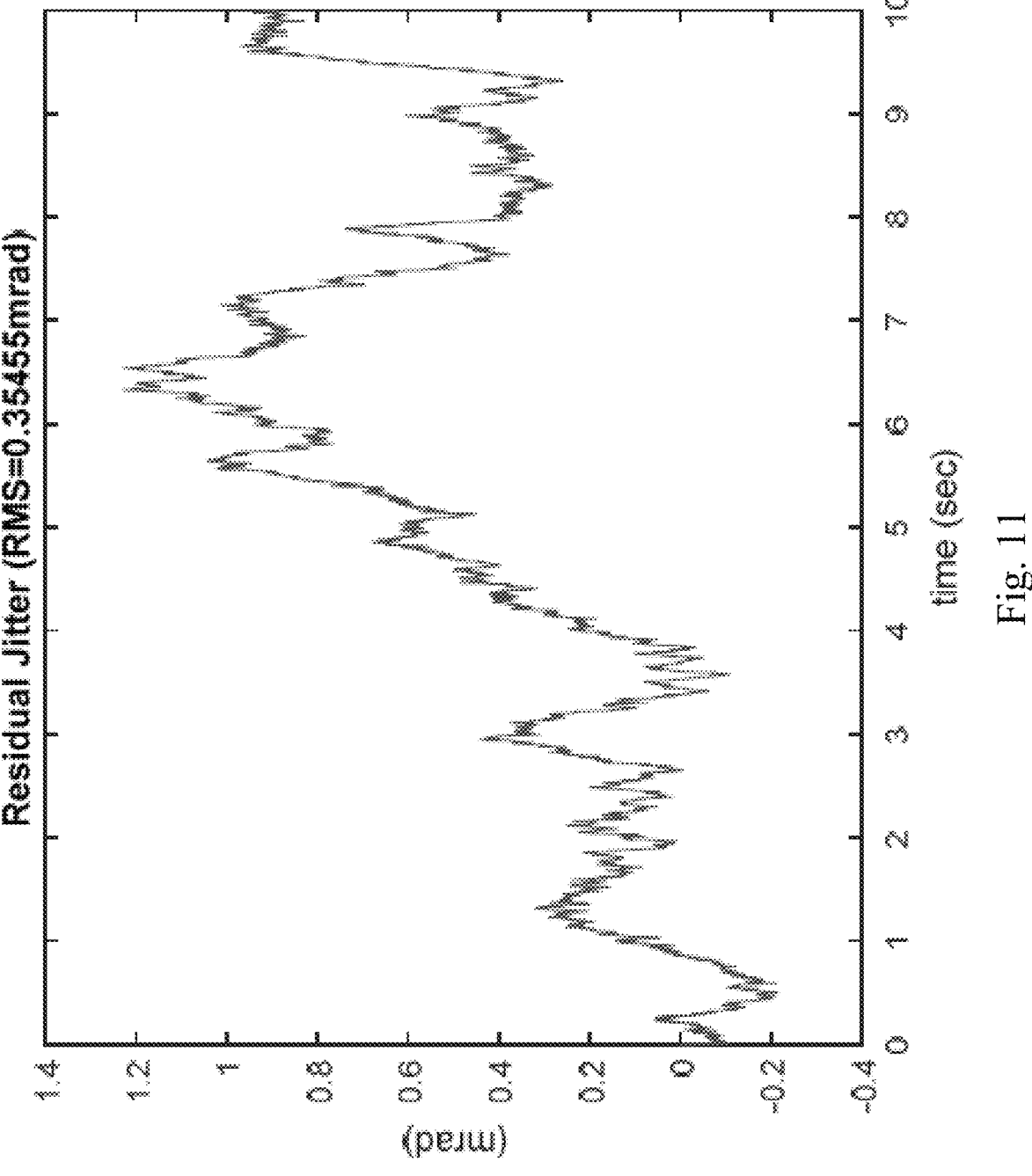
FIG. 11 shows an exemplary time series data of mitigation of the disturbances from both platform movement and hand tremor via control from IMU data only.

FIG. 11 shows an exemplary time series data of mitigation of the disturbances from both platform movement and hand tremor via control from IMU data only. The mitigated disturbances limited significantly the residual jitter to an RMS value of about 0.35 mrad which is significantly less than the initial disturbance with much greater amplitude in the jitter.

Figure 12:
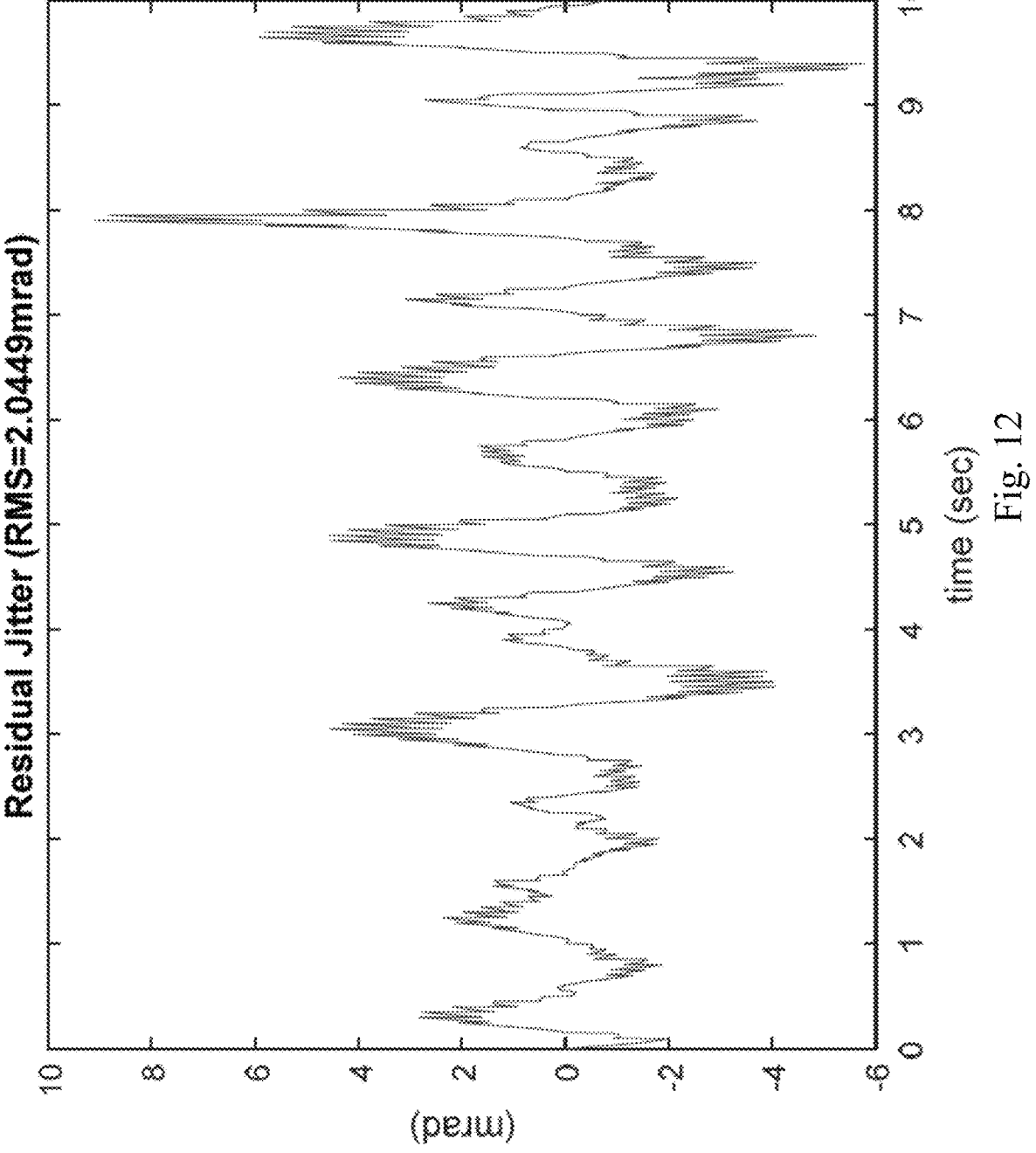
FIG. 12 shows an exemplary time series data of mitigation of the disturbances from both platform movement and hand tremor via control from image data only.

FIG. 12 shows an exemplary time series data of mitigation of the disturbances from both platform movement and hand tremor via control from image data only. This residual jitter may show two pieces of the limitation of using image data alone. For example, large transients can be caught with a relatively slow image sensor frame rate leading to some large jitter peaks when camera data is used alone to attempt to correct for the jitter, such as the 10 mrad peak shown around 8 seconds. In addition, there appears to be cyclical rates was about one Hz that may be related to the camera and processing. These remaining artifacts and the remaining residual jitter of about two mrad RMS shows that one of the described corrections alone is beneficial but not nearly as beneficial as when the effects are combined and controlled as described further herein.

Figure 13:
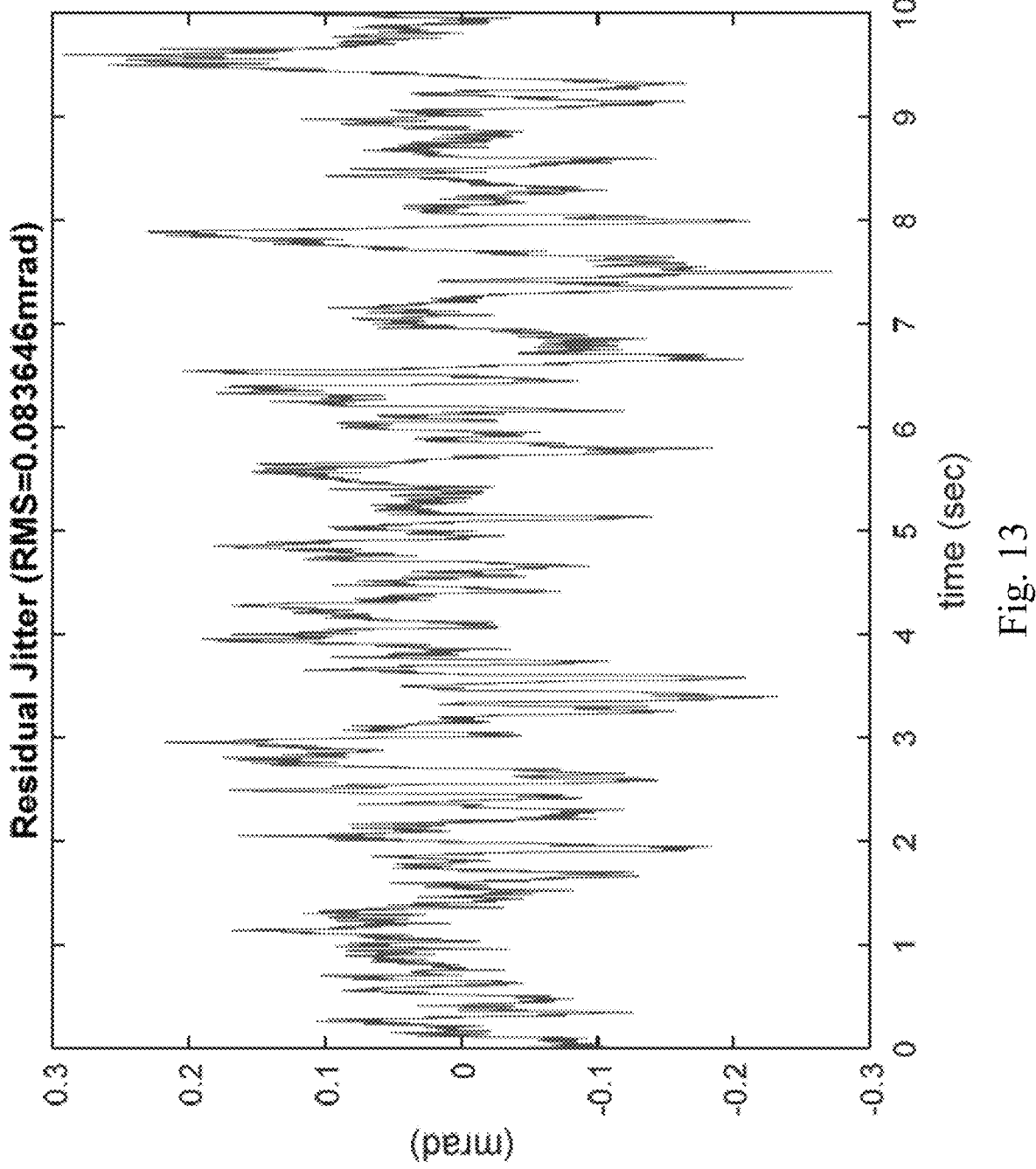
FIG. 13 shows an exemplary time series data of mitigation of the disturbances from both platform movement and hand tremor via control from IMU data as combined with image data as described further herein.

FIG. 13 shows an exemplary time series data of mitigation of the disturbances from both platform movement and hand tremor via control from IMU data as combined with image data as described further herein. combination of control as described herein has created unforeseen benefits in reducing the residual jitter to an RMS value of only 0.084 mrad. This is a significant reduction in the jitter both from the original input jitter from platform movement and hand jitter as well as an improvement over stabilization techniques that use either only data from the IMU or processed image data. The combined effects were very beneficial at reducing jitter, and surprisingly so with respect to the various timing delays between when data is processed for the IMU and the much slower camera data processing through the optical flow processes described herein. These gains in reducing jitter were unforeseen, particularly because of the use of older image data. The gains in jitter reduction shown by using the particular combination described herein by combining image data updated a slower rate than the IMU and that is delayed with respect to the target position given movement of the platform and potentially the target.

Additionally, when operating the laser to provide pulses outside of the imaging system exposure window, these gains in jitter are even further unexpected. Providing open-loop control over pointing of laser designator, without the benefit of positional feedback provided by an image of the laser spot is a particularly challenging task, and the gains in jitter during these modes of operation by using the embodiments of processes herein were unexpected given the drawbacks of not having using a see-spot camera for its intended purpose.

Figure 14:
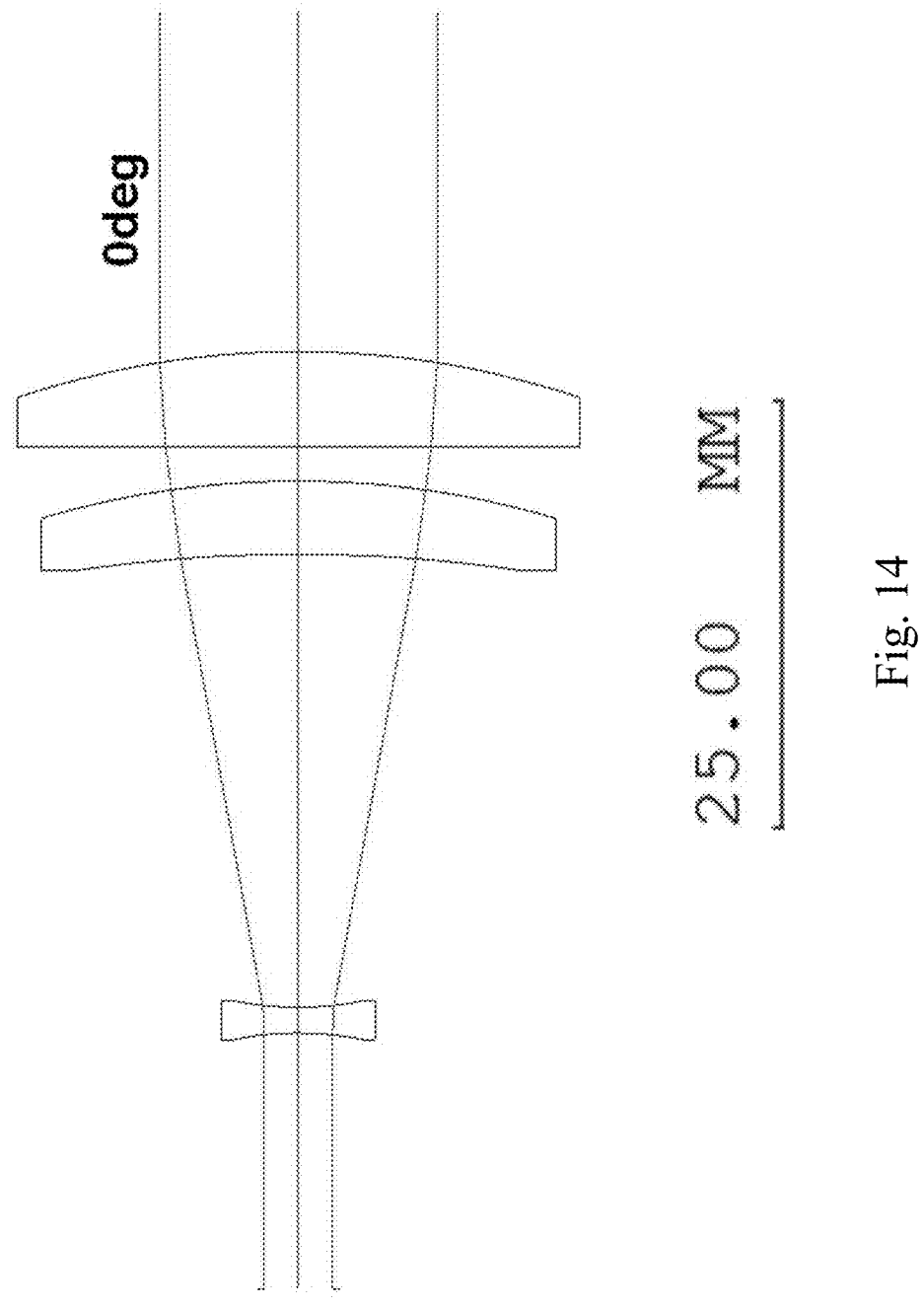
FIG. 14 shows an exemplary beam expander that can deflect a laser beam 1 degree per 1.27 mm lens shift.
Figure 15:
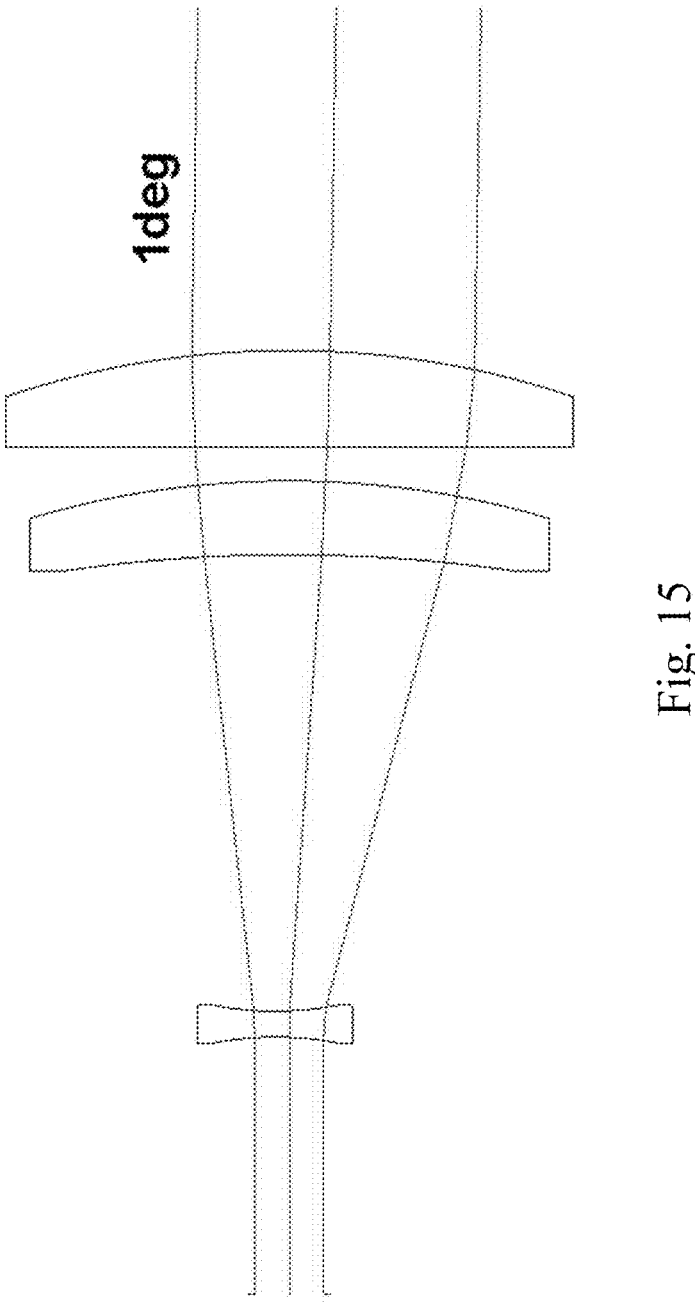
FIG. 15 shows the exemplary beam expander adapted with a lens shift to deflect a laser beam 1 degree.

FIG. 14 shows an exemplary beam expander that can deflect a laser beam 1 degree per 1.27 mm lens shift. the exemplary beam expander shown has a 4× magnification allowing a small lens shift to create and large angular deflection. FIG. 15 shows the exemplary beam expander adapted with a lens shift of 1.27 mm to deflect a laser beam 1 degree. The output of the expanded beam on the right shows a shift of 1 degree and a slightly flatter beam edge on the top then on the bottom.

This patent description and drawings herein are illustrative and are not to be construed as limiting. It is clear that many modifications and variations of this embodiment can be made by one skilled in the art without departing from the spirit of the novel art of this disclosure. While specific parameters, including device configurations, parameters of components, other reference points can also be used. These modifications and variations do not depart from the broader spirit and scope of the present disclosure, and the examples cited here are illustrative rather than limiting.

What is claimed is:

1. A system, comprising:

a laser steering system adapted for use on a platform that is moving relative to a target in a scene that is illuminated by the laser from a platform;

an inertial measurement unit (IMU) connected with the laser steering system;

a processor connected to the inertial measurement unit and the laser steering system and adapted to perform the steps of:

(a) receiving first image data from an imaging system viewing the target in the scene during a first exposure window of a first frame cycle of the imaging system;

(b) calculating background shift data based on an image flow analysis of the first image data and a plurality of image data received prior to the first frame cycle;

(c) receiving IMU data from the IMU;

(d) removing drift from IMU data with the background shift data to create updated IMU data;

(e) based on the first image data and the background shift data, calculating a relative position of the target in the scene;

(f) estimating a time for the laser steering system to reach compliance with a pointing command sent by the processor;

(g) based on the time for the laser steering system to reach compliance, estimating a steering delay time before a time of a laser pulse cycle that is able to be steered by the laser steering system after reaching compliance with the pointing command and that does not occur during an exposure window of the imaging system;

(h) based on the steering delay time, calculating a projected system pointing direction relative to the scene at the time of the laser pulse cycle using both the updated IMU data and the relative position of the target in the scene;

(i) based on the projected system pointing direction at the time of the next laser pulse cycle, calculating a projected target pointing direction at the time of the laser pulse cycle;

(j) based on the projected target pointing direction, creating the pointing command for the laser steering system that does not occur during an exposure window of the imaging system; and (k) sending the pointing command to the laser steering system to steer the laser during the laser pulse cycle.

2. The system of claim 1, wherein the IMU data is received after the first image data.

3. The system of claim 1, wherein the IMU data is used in the calculating the updated system pointing during a time after second image data has been received and before a new relative position of the target in the scene is calculated.

4. The system of claim 1, wherein the IMU data is used in the calculating the updated system pointing during a time after second image data has been received and before a new projected system orientation is calculated.

5. The system of claim 1, wherein the calculating the projected system pointing direction is performed integrating IMU gyroscopic data received from the IMU between subsequent pointing commands.

6. The system of claim 1, wherein the calculating the projected system pointing direction is performed using a predictive filter of a drift error in IMU data from the platform motion.

7. The system of claim 1, wherein the calculating the projected target pointing direction is performed using a predictive filter of target motion in the scene.

8. The system of claim 1, wherein calculating a relative position of the target in the scene includes an angular velocity bias added for movement of the target.

9. The system of claim 1, wherein calculating a relative position of the target in the scene includes creating with a confidence value with respect to the relative position of the target; and wherein the creating the projected target pointing direction further based further on the confidence value.

10. The system of claim 1, wherein calculating a relative position of the target in the scene is performed via pattern matching using convolution.

11. The system of claim 1, wherein calculating a relative position of the target in the scene is performed via an embedded processor.

12. The system of claim 1, wherein the laser steering system comprises:

a laser beam expander for illuminating the target, wherein laser steering system is further adapted to shift a lens in the laser beam expander.

13. The system of claim 1, wherein the laser steering system includes an EMI-resistant mechanism for shifting a lens including a sensor for sensing lens shifts selected from the list containing: Hall effect sensor, and optical sensor.

* * * * *